(12) United States Patent
Huang et al.

(10) Patent No.: US 7,769,941 B2
(45) Date of Patent: Aug. 3, 2010

(54) USB MATRIX SWITCH SYSTEM

(75) Inventors: Han-Cheng Huang, Shijr (TW);
Ying-Chang Tzeng, Shijr (TW)

(73) Assignee: Aten International Co., Ltd. (TW)

( * ) Notice: Subject to any disclaimer, the term of this patent is extended or adjusted under 35 U.S.C. 154(b) by 29 days.

(21) Appl. No.: 12/235,815

(22) Filed: Sep. 23, 2008

(65) Prior Publication Data
US 2010/0077126 A1    Mar. 25, 2010

(51) Int. Cl.
G06F 13/20 (2006.01)
G06F 13/36 (2006.01)

(52) U.S. Cl. .................. 710/316; 710/313; 710/314
(58) Field of Classification Search .......... 710/316
See application file for complete search history.

(56) References Cited

U.S. PATENT DOCUMENTS

| | | | |
|---|---|---|---|
| 6,308,239 B1* | 10/2001 | Osakada et al. | 710/316 |
| 6,532,512 B1* | 3/2003 | Torii et al. | 710/316 |
| 6,549,966 B1* | 4/2003 | Dickens et al. | 710/300 |
| 6,600,739 B1* | 7/2003 | Evans et al. | 370/362 |
| 6,622,195 B2* | 9/2003 | Osakada et al. | 710/316 |
| 6,957,287 B2* | 10/2005 | Lou et al. | 710/72 |
| 7,330,919 B2* | 2/2008 | Zhang et al. | 710/72 |
| 7,340,556 B2* | 3/2008 | Lou et al. | 710/316 |
| 7,433,991 B2* | 10/2008 | Fujita et al. | 710/316 |
| 7,472,217 B2* | 12/2008 | Lou et al. | 710/316 |
| 7,478,191 B2* | 1/2009 | Wurzburg et al. | 710/316 |
| 7,502,878 B1* | 3/2009 | Wright | 710/37 |
| 2001/0032280 A1* | 10/2001 | Osakada et al. | 710/129 |
| 2003/0093599 A1* | 5/2003 | Lou et al. | 710/72 |
| 2005/0138224 A1* | 6/2005 | Ying et al. | 710/1 |
| 2005/0216620 A1* | 9/2005 | Sandulescu et al. | 710/62 |
| 2005/0283563 A1* | 12/2005 | Lou et al. | 710/316 |
| 2006/0059293 A1* | 3/2006 | Wurzburg et al. | 710/313 |
| 2006/0095644 A1* | 5/2006 | Fujita et al. | 710/313 |
| 2006/0123182 A1* | 6/2006 | Sandulescu et al. | 710/316 |
| 2006/0195637 A1* | 8/2006 | Zhang et al. | 710/72 |
| 2007/0174535 A1* | 7/2007 | Lou et al. | 710/316 |
| 2007/0180181 A1* | 8/2007 | Chen et al. | 710/313 |
| 2007/0245058 A1* | 10/2007 | Wurzburg et al. | 710/313 |
| 2007/0255869 A1* | 11/2007 | Walters et al. | 710/62 |
| 2007/0255885 A1* | 11/2007 | Bohm et al. | 710/316 |
| 2008/0005421 A1* | 1/2008 | Chang et al. | 710/62 |
| 2008/0091858 A1* | 4/2008 | Zhang et al. | 710/72 |
| 2009/0083453 A1* | 3/2009 | Hsueh et al. | 710/36 |

(Continued)

Primary Examiner—Ryan M Stiglic
(74) Attorney, Agent, or Firm—Chen Yoshimura LLP

(57) ABSTRACT

An USB matrix switch system provided for a plurality of USB devices shared with a plurality of hosts is disclosed. The system comprises: (1) a plurality of DP PHYs, respectively, corresponding to the USB devices so as to transfer those series signal received from the USB devices to parallel signals; (2) a plurality of UP PHYs, respectively, corresponding to the hosts for transferring signal received therefrom to parallel signals or doing the reversal operation; (3) a plurality of hubs, respectively, corresponding to the UP PHYs, each hub has a digital repeater, a TT, an up router, a down router, and a hub controllers; (4) a signal fetching monitor for fetching a control signal provided by a user; (5) a plurality of signal control switch modules having a down stream port controller, a disconnection emulator, provided for simulating a disconnection status while the down stream port controller is empty, and a select MUX provided for switching a selected USB device to a selected hub in accordance with content of the hot key.

15 Claims, 6 Drawing Sheets

U.S. PATENT DOCUMENTS

2009/0106477 A1* 4/2009 Lou et al. .................. 710/316
2009/0204742 A1* 8/2009 Wiler ........................ 710/316
2009/0210608 A1* 8/2009 Chang et al. ................ 710/316
2010/0042767 A1* 2/2010 McLeod ..................... 710/300

* cited by examiner

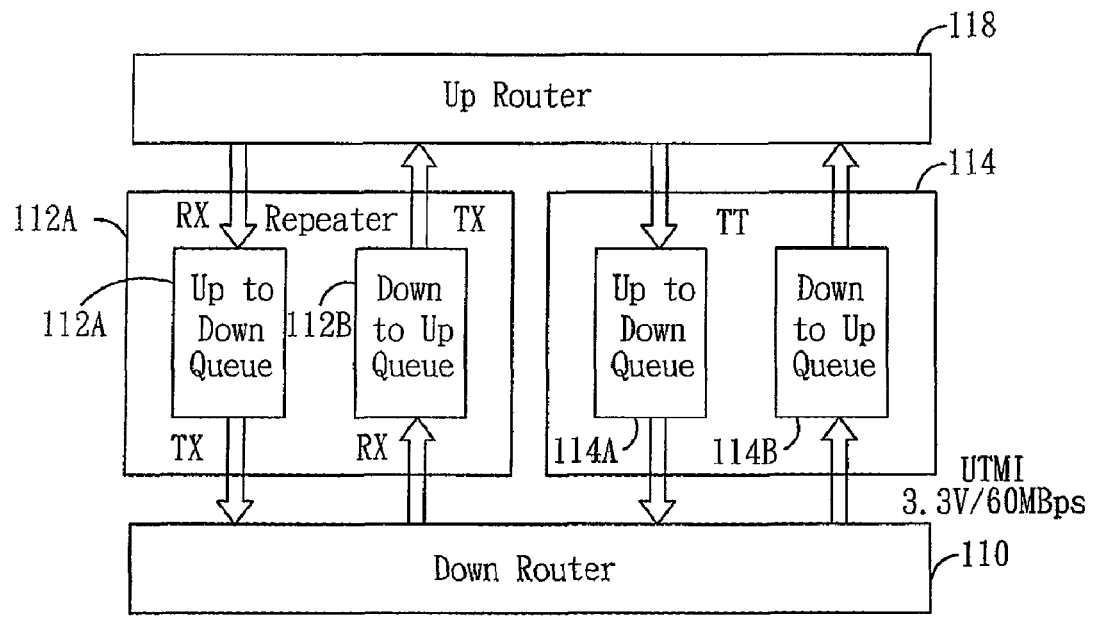
F I G . 2 B
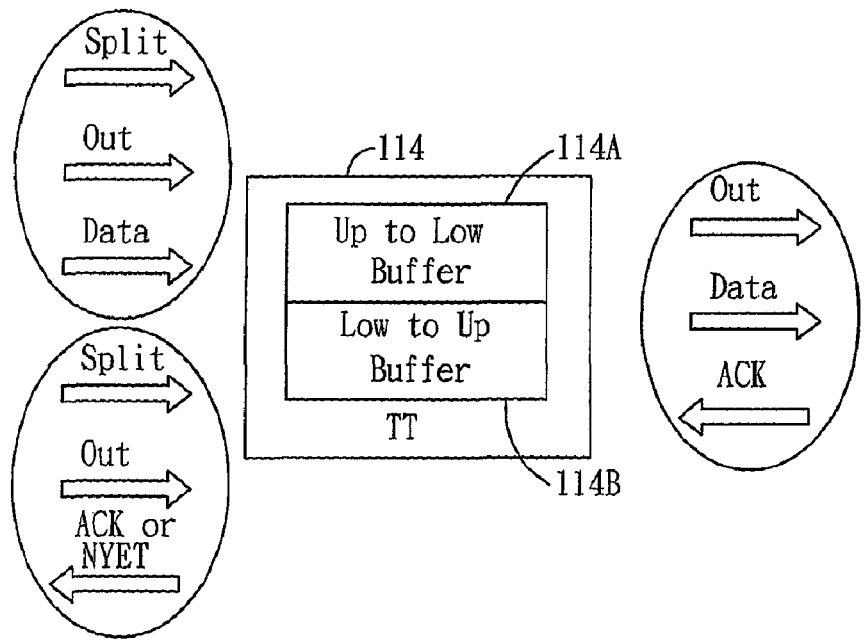
F I G . 2 C

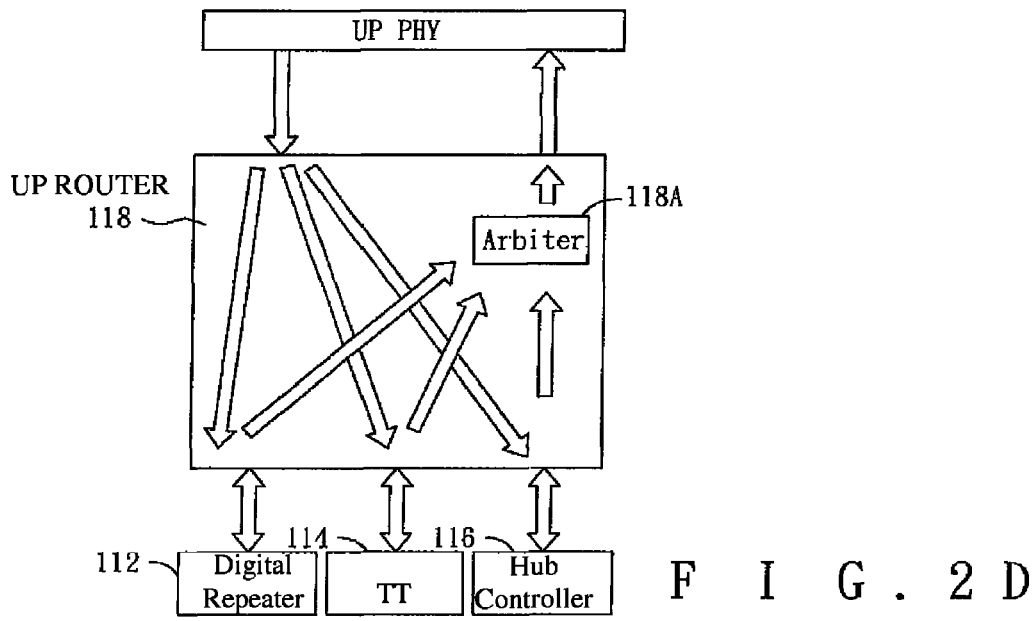
F I G . 2 D
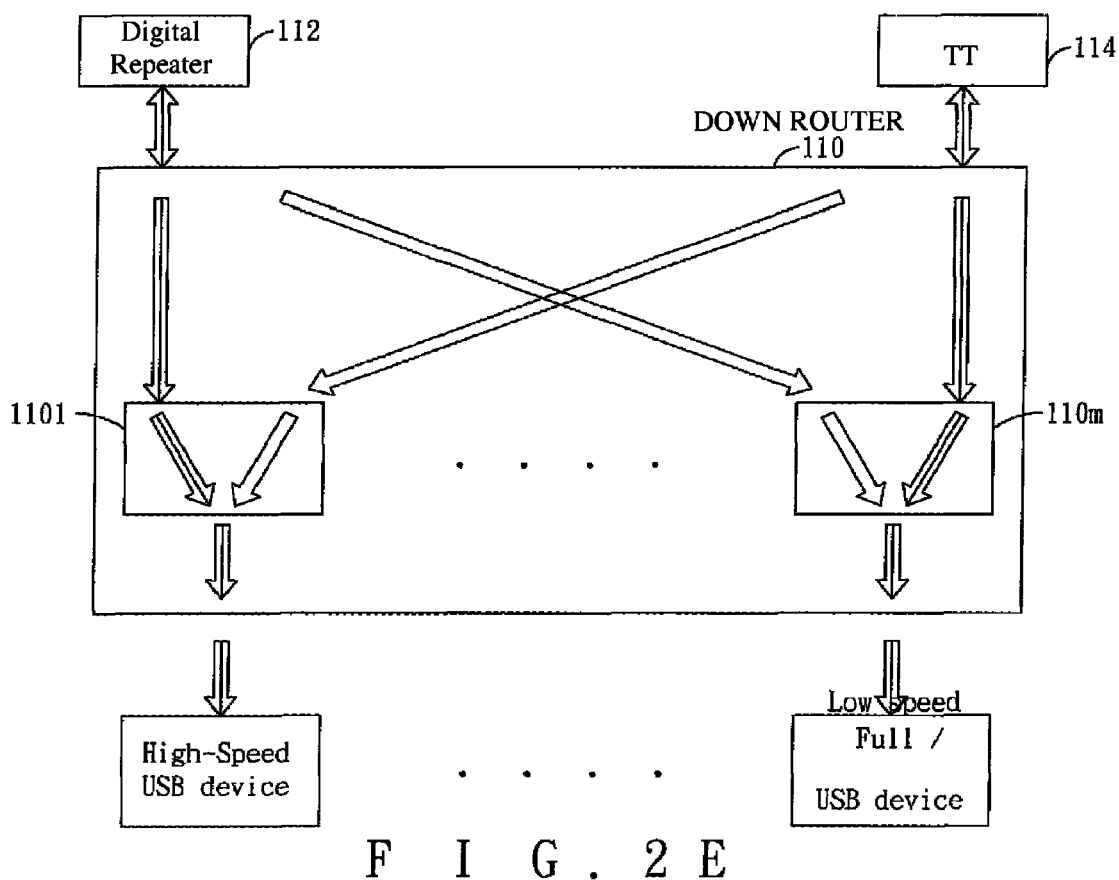
F I G . 2 E

USB MATRIX SWITCH SYSTEM

FIELD OF THE INVENTION

The present invention pertains to a USB matrix switch system, and particularly to an USB matrix switch system for a plurality of hosts common sharing resources of a plurality of USB devices.

DESCRIPTION OF THE PRIOR ART

As the external devices connected to the computer through the USB ports, it becomes easier and more convenient to use those expanded devices than through a RS 232 series port or a parallel port for most of users. Whereas, if a plurality of hosts are desired to share common resources of a plurality of USB devices, the situation may become complexity. Since some of the USB devices are with high data transfer rate such as card reader, high-grade scanner, which satisfy the specification of USB 2.0 but some of the USB devices have only low/full data transfer rate such as keyboard and mouse.

According to USB 2.0 specification, the differential voltage is 3.3V for full speed and/or low speed transfer rate, but it becomes 400 mV for high speed transfer rate. Such low voltage 0.4V is not enough to provide as a digital data, 0, or 1 judgment, in current manufacturing process of application-specific integrated circuit (ASIC). It is thus complex to design a matrix switch circuit or an advance manufacturing process of ASIC.

Referring to FIG. 1a, it shows a conventional matrix switch system 50 for m USB devices shared by n hosts. The switch system contains n hubs HUB1 to HUBn. Each USB device has a bus switch 30 corresponding thereto. The bus switch 30 itself is an analog type, which is demanded to have precise matched impedance and still exists some noise problems especially for high speed USB signal, it have to fine tune the impedance more precise. Without precise impedance correction, the USB device compatible would be bad. Apart from that, the trace layout of the bus switches is complex and thus each bus switch itself is formed as a chip. Each hub is also a chip. It requires large area to mount the chips of hubs and bus switches on a print circuit board (PCB).

Furthermore, since the voltages for high speed and for low/full speed devices are different and the differential voltage is only 0.4V for former USB device. It is thus in the matrix switch system for high speed USB devices versus high speed hosts, the repeater 35 in the hub can only be an analog type. As is shown in FIG. 1B, it shows a schematic structure of a conventional hub. In addition to an analog repeater 35, it comprises a down physical layer transceiver DP PHY, an up physical layer transceiver UP PHY, and a transaction translator hereinafter called TT 40. TT 40 is a buffer device for those high speed hosts to access low and/or full speed USB device so as to avoid one of the low or full speed USB device occupy the entire channel width. The working voltage of the TT is 3.3V. It is thus can be a digital type or an analog type device.

As aforementioned descriptions in the background of the present invention, a conventional matrix switch system for m USB devices shared by n hosts requires n hubs and m bus switches, which are an analog type. And the drawbacks include: high noise, precise impedance match, large layout areas are often presented in the conventional switch system so that the USB devices may have the compatible problems and large package volume.

SUMMARY OF THE INVENTION

In comparison with a digital device, an analog device is known associated with high noise. An object of the present invention is thus to provide an USB switch system integrated in an ASIC chip and operated by digital signals. Accordingly, the ASIC chip can provide for a plurality of USB devices shared by a plurality of hosts. No matter the USB devices are low speed keyboard, mouse, or high speed USB flash disk, or USB scanner. The signals running in the hub are all parallel signals. Both of the repeater and TT are all digital types so that they will provide least noise and low layout area occupied in the integrated circuit.

An USB matrix switch system provided for a plurality of USB devices shared with a plurality of hosts is disclosed. The system comprises: (1) a plurality of DP PHYs, respectively, corresponding to the USB devices so as to transfer those series signal received from the USB devices to parallel signals; (2) a plurality of UP PHYs, respectively, corresponding to the hosts for transferring signal received therefrom to parallel signals or doing the reversal operation; (3) a plurality of hubs, respectively, corresponding to the UP PHYs, each hub has a digital repeater, a TT, an up router, a down router, and a hub controllers; (4) a signal fetching monitor for fetching a control signal provided by a user; (5) a plurality of signal control switch modules having a down stream port controller, a disconnection emulator, provided for simulating a disconnection status while the down stream port controller is empty; and a Select MUX provided for switching a selected USB device to a selected hub in accordance with content of said hot key.

In the preferred embodiment, for a high speed USB deice having data to transfer to a selected high speed host is through the digital repeater. Hence, the present invention solve the noise problem, precise impedance matched problem in accordance with the prior art.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2B shows a digital repeater and TT and the action thereof while receiving signals from upper level or from the down level according to a preferred embodiment of the present invention.

FIG. 2C shows a schematic diagram illustrating processes of out token and data followed through TT according to the present invention.

FIG. 2D shows an up router responding one among a repeater, TT, hub controller according to the present invention.

FIG. 2E shows a down router has m terminals for receiving parallel signals from the repeater and TT according to the present invention.

DESCRIPTION OF THE PREFERRED EMBODIMENT

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

The present invention provides a digital USB matrix switch system integrated in one ASIC chip. And the manufacture processes requires only deep-submicron process such as 0.18 μm.

Figure 1A:
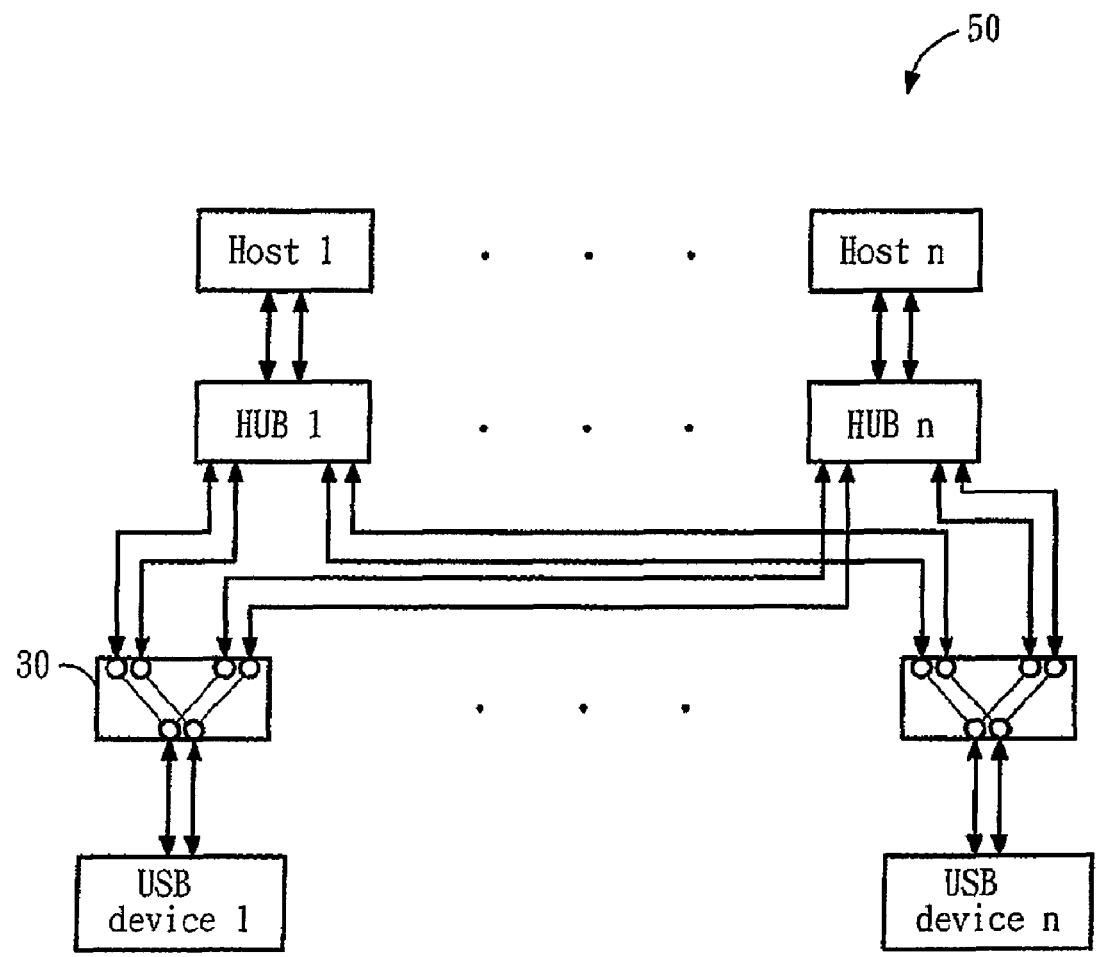
FIG. 1A shows a conventional USB matrix switch system according to the prior art.
Figure 1B:
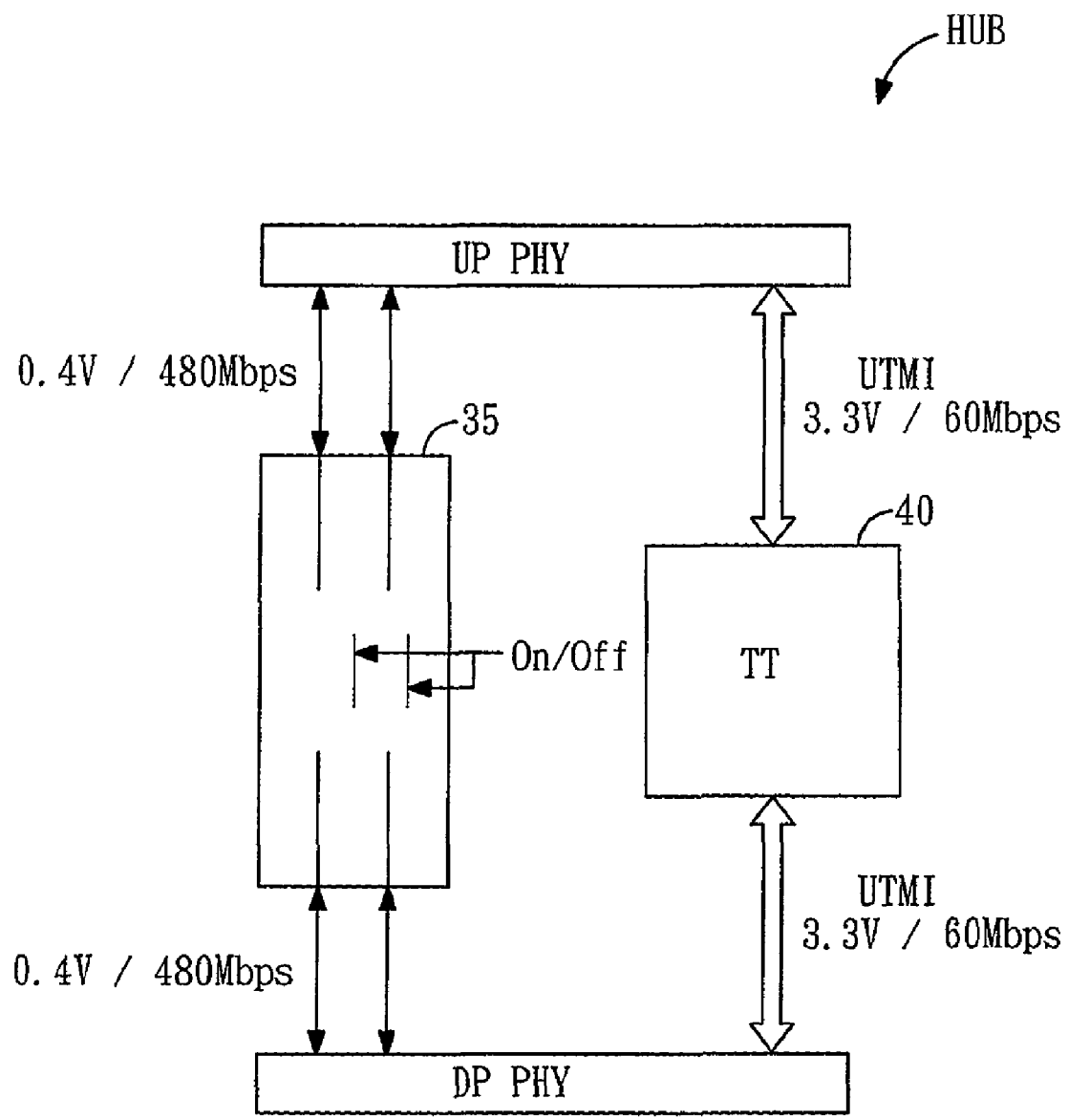
FIG. 1B shows a hub having an analog repeater and TT according to the prior art.
Figure 2A:
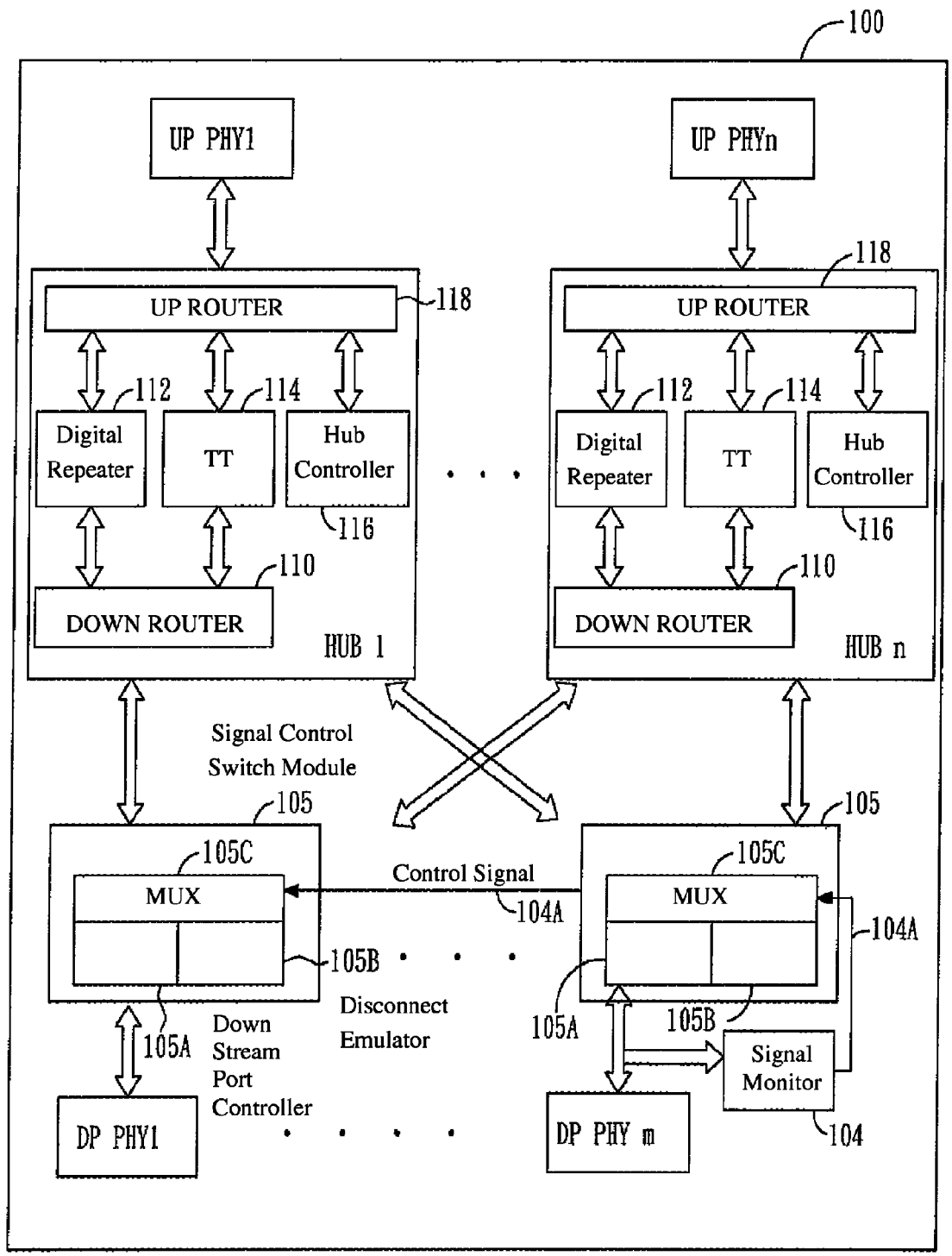
FIG. 2A shows function blocks of an USB matrix switch system in an ASIC chip according to a preferred embodiment of the present invention.

To overcome the aforementioned problems, an USB matrix switch system according to the present invention is disclosed, as is shown in FIG. 2A. In FIG. 2A, it shows the function blocks in the ASIC chip 100 for m USB devices shared by n hosts from the bottom thereof comprising: (1) m down physical layer receivers, DP PHY1 to DP PHYm, hereinafter called DP PHY, if it does not specially point out, one to one corresponds to the m USB devices (not shown); (2) m signal control switch modules 105; (3) n hubs HUB1 to HUBn, hereinafter called HUB; (4) n upper physical layer receivers, UP PHY1 to UP PHYn; and (5) a signal monitor 104 for fetching the command signal retrieved by hot key keyed in.

The DP PHY is to transfer series signals received to parallel signals such as USB transceiver macrocell interface (UTMI) parallel signals, random access memory (SRAM) signals or low pin count (LPC) parallel signals. The DP PHY operates at different differential voltage in accordance with the data transmitting rate. But the UTMI parallel signals are operated at the same voltage, 3.3V. The DP PHY is to transfer parallel signals received from the correspondent USB device to series signals and transmit the series signals to the correspondent signal control switch module 105. The DP PHY is to transfer series signals received from the correspondent signal control switch module 105 to parallel signals and transmit the parallel signals to the correspondent USB device. That is, each DP PHY is connected between a USB device and a signal control switch module 105, and converts signals between parallel signals and series signals. The UP PHY is to transfer parallel signals received from the correspondent hub to series signals and transmit the series signals to the correspondent host. The UP PHY is to transfer series signals received from the correspondent host to parallel signals and transmit the parallel signals to the correspondent hub. That is, each UP PHY is connected between a hub and a host, and converts signals between parallel signals and series signals.

Each signal control switch module 105 includes a down stream port controller 105A, a disconnect emulator 105B, and a select multiplexer (MUX) 105C. The down stream port controller 105A is to receive the parallel signals from the lower level thereof, a corresponding DP PHY, and the select MUX 105C is to switch the parallel signals in the down stream port controller 105A to the target HUB in accordance with the control signal 104A sent by the signal monitor 104. As no signals are dumped to the down stream port controller 105A, the disconnect emulator 105B will be simulated to a status of disconnected with its lower end, e.g. no USB device. Each signal control switch module 105 connects the correspondent DP PHY to all hubs.

The monitor is installed to intercept the specified signals from the USB port and analyze the switch signals of the down stream thereto. Each signal control switch module may be arranged to have one monitor or all of the signal control switch modules have just one monitor to monitor the intercept the specified signals from the USB port.

The disconnect emulator appended to the down stream port controller is to emulate the situation that the host and the unselected down stream port are disconnected while the corresponding USB device is unselected according to the select Mux. The select signal is filed by the USER, which is then intercepted by the monitor(s) to determine which one of the hubs is selected and the selected hub will be connected to the real down-stream port.

The select signal can be obtained by the two ways: one is received by external switch circuit. The other is intercepted by the monitor(s). For instance, the assigned down stream port pointed out the plug-in device is a HID KEYBOARD and the intercepted five signals are scroll, scroll, and 3 inserts and 1, the monitor(s) will assign the down stream port 3 connected to 1.

Referring to FIG. 2B, the HUB includes an up router 118, a digital repeater 112, a transaction translator (TT) 114, a hub controller 116, and a down router 110. The detailed descriptions are as follows: comparing to the analog repeater provided with bypass function for high speed USB to high speed host, the digital repeater 112 includes a first queue 112A and a second queue 112B. The first queue 112A is device retrieving signals from the up router 118 and transmitting them to the by down router 110 by a rule of first in first out. By contrast, the second queue 112B is a queue provided for parallel signals received from the down router 110 and transmitting them to the up router 118.

The TT 114 is provided for high speed host versus low and/or full speed USB device to access signals to prevent the channel width from occupied by a low and/or full speed USB device. Basically, the TT 114 includes a first buffer 114A and a second buffer 114B. The first buffer 114A is provided for high speed host from the up router transmitting data to the low and/or full speed USB device through down router 110. The second buffer 114b is provided for data from the low and/or full speed USB device through down router 110 to a high speed host through the upper router 118. Herein the high speed USB devices or hosts are pointed out those devices or host whose data transmitting speed comply with the specification of USB 2.0, 480 Mbps. The data transmitting speed for full speed is about 12 Mbps and the low speed device such as a keyboard or a mouse, usually has data access rate by 1.5 Mbps.

The TT 114 (transaction translator) is designed according to the USB 2.0 specification. While a high speed host accesses the signals from the peripheral USB device is a full/low speed type. The TT 114 provided as buffers so that the full/low speed USB device will not occupy the whole channel width of the high speed channel.

FIG. 2C is a schematic diagram illustrating processes of out token and data followed through the TT 114. While a high speed host is prepared to access to a full/low speed USB device. The processes are as follows: firstly, the host sent a split start token to inform TT 114 of which down stream ports is the destination and the out token and the data will be delivered thereto. The TT 114 then stores the out token and the data followed to the first buffer 114A. Thereafter, the out token and the data in the first buffer 114A will be delivered to the DP by either full or low speed transfer rate. During forgoing delivering time, the host is still capable of accessing others e.g. high speed device or ports without being interrupted or waited. After waiting a while, the host will send 'split complete token" to TT 114 to inquire whether the data are transferred completely. If the first buffer 114A is already empty, TT 114 will send 'ACK" signal (acknowledge) responded by DP to the host, otherwise, a "NYET" signal (not yet) will be sent to host. The host will access to other high speed device and send 'split complete TOKEN" again, as aforementioned, until the data are transferred completely.

The up router 118 includes an arbiter 118A, as is shown in the FIG. 2D. A request packet issued by a host will be transferred to parallel interface signals firstly by the UP PHY corresponded and the parallel signals are then duplicated to three copies and sent, respectively, to the digital repeater 112, TT 114, and hub controller 116 by the up router 118. One and only one of them 112, 114, and 116 will respond to the arbiter 118A. Those packets without response will be discarded. The up router 118 will record the replier and then connect the UP PHY to the down level device, i.e. the USB device through the digital repeater 112, TT 114 or hub controller 116.

When the up router 118 receives the up UTMI, it will duplicate three copies and deliver to digital repeater 112, TT 114, and Hub controller, respectively. Only one of them will respond to up router 118. Hence, up router 118 will wait for a "TX REQ" signal (transmitting request) issued by an USB device to the arbiter and then route the responded UTMI Tx signal to the UTMI of the up stream.

Referring to FIG. 2E, the schematic shows the parallel signals sent from an upper level through the down router 110. As aforementioned descriptions, each down router 110 has m terminals or ports 1101 to 110m. The parallel signals sent by high speed host to the down level, the up router 118 will record the signal source coming from which host. All terminals 1101 and 110m in the down router 110 will receive signals coming from both digital repeater 112 and TT 114, as is shown in FIG. 2D. As the HUB is connected with a low and/or full speed USB device, the down stream port controller 105A will inform the message of the USB device so that only those parallel signals through the TT 114 will be sent to the down level. By contrast, as the device is a high speed USB device, the down router 110 will discard the content in the TT 114 and send the content of the digital repeater 112 to the USB device.

Every device may receive the UTMI Tx signal from either a digital repeater 112 or a TT 114. The down router 110 will determine the device followed which signal should be acquired by it in accordance with the status of the DP informed by DP controller 105A. For instance, the device 1 informs the down router 110 that the device 1 is a high speed one. Then the down router 110 will send the Tx signal from the digital repeater 112 to the device 1. Device n informs the down router that the device n is a LS/FS one. Then the down router 110 will send the Tx signal from the TT 114 to the device n, as showed in FIG. 2D.

Figure 2F:
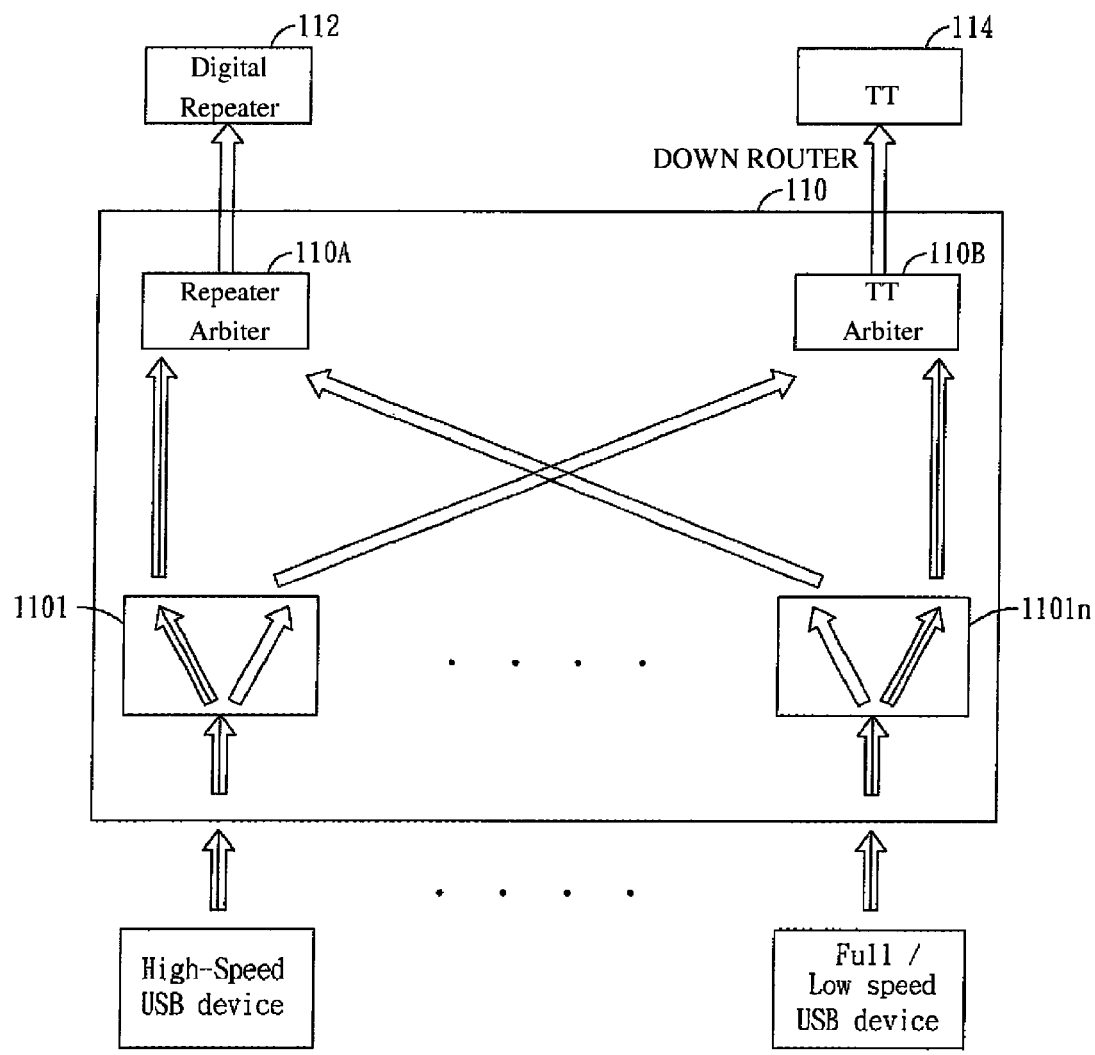
FIG. 2F shows a down router have m terminals for receiving parallel signals or disconnected signals from the down level according to the present invention.

Please refer to FIG. 2F, it shows parallel signals sent from a down level to the upper levels through down router 110. As the parallel signals in the down stream port 110A is sent and switched to the selected HUB according to the signal monitor 114 detected. The down router 110 in the selected HUB will have a terminal records the connected USB device, the other terminals without the USB device will be simulated to be at the status of disconnection by the disconnect emulator. Furthermore, no matter what kind of speed type of USB device has, the parallel signals at the terminal will be sent to the digital repeater arbiter 110A and the TT arbiter 110B.

While the down router 110 receives the UTMI Rx signal, it will send it to either the repeater arbiter 110A or the TT arbiter 110B in accordance with the speed of the device. The arbiter, either the repeater arbiter 110A or the TT arbiter 110B, which receives the REQ will up deliver the UTMI Rx.

As the USB device to be connected is a low and/or full speed, the digital repeater arbiter 110A will discard the parallel signal but the TT arbiter 110B will send the parallel signals to the TT 114.

As the USB device to be connected is a high speed, the TT arbiter 110B will discard the parallel signals but the digital repeater arbiter 110A will send the parallel signals to the digital repeater 112.

The benefits of the present invention are:
1. All the forging DP PHY, signal control switch module 105, signal monitor 104, HUB, and UP PHY can be integrated in an ASIC chip, so that the area occupied at the print circuit board is small.
2. Since the signals operated in the ASIC are only parallel signals, it is thus operated at a voltage of about 3.3V and thus the repeater is a digital type. Low noise is anticipated.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:
1. An universal serial bus (USB) matrix switch system provided for a plurality of USB devices shared with a plurality of hosts, comprising:
   a plurality of down physical layer transceivers (DP PHYs), one to one corresponding to the USB devices so as to transfer those series signal received from the USB devices to parallel signals;
   a plurality of up physical layer transceivers (UP PHYs), one to one corresponding to the hosts;
   a plurality of hubs, one to one corresponding to the UP PHYs, each the hub having a digital repeater, a transaction translator (TT), an up router, a down router, the down router recorded connection status with the USB devices or disconnection status;
   a signal fetching monitor for fetching a control signal provided by an user; and
   a plurality of signal control switch modules, one by one corresponding to the DP PHYs, each signal control switch module comprising:
   a down stream port controller,
   a disconnection emulator, provided for simulating a disconnection status while the down stream port controller receives no signal, and
   a select multiplexer (MUX) provided for a selected USB devices switched to a selected hub of the hubs in accordance with the control signal.

2. The USB matrix switch system according to claim 1 wherein each of the digital repeater comprises a first queue and a second queue, the first queue receiving parallel signals via said up router from one of the hosts through a corresponding UP PHY and transmitting the signals via said down router to one of the USB devices through a corresponding DP PHY and the second queue receiving parallel signals via said down router from one of the USB devices through a corresponding DP PHY and transmitting the signals via said up router to one of the hosts through a corresponding UP PHY.

3. The USB matrix switch system according to claim 1 wherein each hub further comprises a hub controller.

4. The USB matrix switch system according to claim 3 wherein the up router is located atop level of said digital repeater, said TT and said hub controller, and when said up router receives from a corresponding UP PHY parallel signals to be transmitted downwardly, the up router will duplicate three copies and transmit them to the digital repeater, the TT and the hub controller respectively and wait for response from one of the repeater, the TT and the hub controller.

5. The USB matrix switch system according to claim 3 wherein the up router comprises an arbiter for determining a replier choosing from the digital repeater, TT, and hub controller and connecting the replier with one of the UP PHYs.

6. The USB matrix switch system according to claim 1 wherein the down router has m number of terminals so as to record disconnection status or connection status with the USB devices.

7. The USB matrix switch system according to claim 1 wherein all of the select MUXs are coupled with the signal fetching monitor.

8. The USB matrix switch system according to claim 1 wherein the DP PHYs, signal control switch modules, signal fetching monitor, hubs, and UP PHYs are all integrated in an application-specific integrated circuit (ASIC) chip.

9. The USB matrix switch system according to claim 1 wherein the parallel signals are USB transceiver macrocell interface (UTMI) signal or low pin count parallel signals.

10. The USB matrix switch system according to claim 1 wherein the control signal is generated while the user press a hot key.

11. An USB matrix switch system for m number of universal serial bus (USB) devices sharing n number of hosts, the USB matrix switch system comprising:
   m number of signal control switch modules, each having a select multiplexer (MUX), a down stream port controller, and a disconnect emulator;
   m number of down physical layer transceivers (DP PHYs) to receive series signals from the m USB devices, respectively and to output parallels signals to the down stream port controller;
   a signal fetching monitor provided for receiving a control signal from an user;
   n number of hubs, each having a down router, a digital repeater, a transaction translator (TT), a hub controller, and an up router so that the parallel signals in one of the down stream port controllers will be switched to the down router of a selected hub by the select MUXs according to the control signal received, and through one of the digital repeater and the TT transmitted to the up router; and
   n number of up physical layer transceivers (UP PHYs) to receive the parallel signals from the n number of hubs and output the series signals to the n number of hosts respectively, and to receive series signals from the n number of hosts and output parallel signals to the n number of hubs respectively, where n, and m are natural number.

12. The USB matrix switch system according to claim 11 wherein each of the digital repeater comprises a first queue and a second queue, the first queue receiving parallel signals via said up router from one of the hosts through a corresponding UP PHY and transmitting the signals via said down router to one of the USB devices through a corresponding DP PHY and the second queue receiving parallel signals via said down router from one of the USB devices through a corresponding DP PHY and transmitting the signals via said up router to one of the hosts through a corresponding UP PHY.

13. The USB matrix switch system according to claim 11 wherein the up router comprises an arbiter for determining a replier choosing from the digital repeater, TT, and hub controller and connecting the replier with one of the UP PHYs.

14. The USB matrix switch system according to claim 11 wherein the down router has m number of terminals so as to record disconnection status or connection status with the USB devices.

15. The USB matrix switch system according to claim 11 wherein the parallel signals are USB transceiver macrocell interface (UTMI) signal or low pin count (LPC) parallel signals.

* * * * *